US008049604B2

(12) United States Patent
Yamada et al.

(10) Patent No.: US 8,049,604 B2
(45) Date of Patent: Nov. 1, 2011

(54) SHOCK-DETECTING APPARATUS FOR INDUSTRIAL VEHICLE

(75) Inventors: Tadashi Yamada, Aichi-ken (JP); Toshinari Fukatsu, Aichi-ken (JP); Yoshiharu Ito, Aichi-ken (JP); Hidenori Oka, Aichi-ken (JP)

(73) Assignee: Kabushiki Kaisha Toyota Jidoshokki, Aichi-ken (JP)

( * ) Notice: Subject to any disclaimer, the term of this patent is extended or adjusted under 35 U.S.C. 154(b) by 337 days.

(21) Appl. No.: 12/471,635

(22) Filed: May 26, 2009

(65) Prior Publication Data

US 2009/0289781 A1 Nov. 26, 2009

(30) Foreign Application Priority Data

May 26, 2008 (JP) ................................ 2008-136580
Aug. 8, 2008 (JP) ................................ 2008-205827

(51) Int. Cl.
*B60Q 1/00* (2006.01)

(52) U.S. Cl. ....................................... 340/438; 340/679

(58) Field of Classification Search .................. 340/438, 340/425.5, 425.22, 440, 442, 443, 679, 684, 340/685, 686.1; 180/290, 900, 902
See application file for complete search history.

(56) References Cited

U.S. PATENT DOCUMENTS

| | | | | |
|---|---|---|---|---|
| 6,195,605 | B1 | 2/2001 | Tabler et al. | |
| 6,956,473 | B2 * | 10/2005 | Hanood | 340/522 |
| 7,251,094 | B2 | 7/2007 | Miyano | |
| 7,362,218 | B2 * | 4/2008 | McCall et al. | 340/447 |
| 7,367,227 | B2 * | 5/2008 | Stewart et al. | 73/146 |

FOREIGN PATENT DOCUMENTS

| | | | |
|---|---|---|---|
| EP | 1 752 747 | A2 | 2/2007 |
| JP | 8-177544 | A | 7/1996 |
| JP | 10-246731 | A | 9/1998 |
| JP | 2000-194895 | A | 7/2000 |
| JP | 2007-39213 | A | 2/2007 |
| JP | 2007-290817 | A | 11/2007 |
| JP | 2007-308227 | A | 11/2007 |
| JP | 2008-056436 | A | 3/2008 |

OTHER PUBLICATIONS

BMI Technologies: "G" Force, Apr. 13, 2004, XP002543883, Impact Monitoring Systems.

* cited by examiner

*Primary Examiner* — Toan N Pham
(74) *Attorney, Agent, or Firm* — Sughrue Mion, PLLC

(57) ABSTRACT

A shock-detecting apparatus for an industrial vehicle has a shock-detecting sensor that is fixed to the industrial vehicle for detecting a shock and generating an output signal, a shock value computer for computing a shock value based on the output signal which is received sequentially, a judging device for judging whether or not the shock value is greater than a threshold value, a warning generator for generating a warning signal when the judging device judges that the shock value is greater than the threshold value and a threshold value setting device for setting the threshold value. The threshold value setting device includes a display for displaying a peak value in a predetermined period which allows a user to read the peak value, wherein the peak value is determined by the computed shock value during the predetermined period and a threshold value input unit for inputting the threshold value manually.

9 Claims, 8 Drawing Sheets

SHOCK-DETECTING APPARATUS FOR INDUSTRIAL VEHICLE

BACKGROUND OF THE INVENTION

The present invention relates to a shock-detecting apparatus for an industrial vehicle.

Japanese Patent Application Publication 2007-39213 discloses a shock-detecting apparatus for an industrial vehicle such as a forklift truck, having a shock-detecting sensor, a shock value computer, a judging device, a warning generator and a threshold value setting unit.

The shock-detecting sensor is a shock sensor fixed to an lifting device of a forklift truck so as to detect a shock acting on a cargo loaded on an lifting device and generate an output signal. Thus, the shock value computer receives the output signals sequentially thereby to compute the shock values respectively. The judging device judges whether or not the shock value is greater than a threshold value. When the judging device judges that the shock value is greater than the threshold value, the warning generator outputs a warning signal. The threshold value input unit allows a user to set an arbitrary threshold value at the initialization or any other time.

The conventional shock-detecting apparatus for the industrial vehicle as mentioned above compares the sequentially computed shock values with the threshold value sequentially while the forklift performs a loading operation and the like. When the shock value is judged to be greater than the threshold value, the warning generator outputs a warning signal with the result that the user of the forklift prevents damage to the cargo or the cargo collapse due to the excessive shock, and enables to perform the loading operation safe.

A proper range for the shock value acting on the industrial vehicle varies depending on where and how the industrial vehicle is used. Therefore, when the user installs the conventional shock-detecting apparatus with the industrial vehicle and sets the threshold value, he is apt to set the threshold value by trial and error. For example, after the user sets an arbitrary threshold value and operates the industrial vehicle actually, he may increase or decrease a threshold value so as to pursue the proper threshold value (trial and error) if wrong warning signals are output. This may bring about a decrease in reliability and it takes time to improve reliability after all. In this aspect, although Japanese Patent Application Publication 2007-39213 describes that the threshold value is decided based on the actual data operated by the experienced drivers, the concrete method to decide the threshold value is unclear and anyway it is still time-consuming to decide the threshold value.

The present invention is made to solve the above problems of the prior art and to provide a shock-detecting apparatus for an industrial vehicle which can facilitate to decide the threshold value.

SUMMARY OF THE INVENTION

A shock-detecting apparatus for an industrial vehicle has a shock-detecting sensor that is fixed to the industrial vehicle for detecting a shock and generating an output signal, a shock value computer for computing a shock value based on the output signal which is received sequentially, a judging device for judging whether or not the shock value is greater than a threshold value, a warning generator for generating a warning signal when the judging device judges that the shock value is greater than the threshold value and a threshold value setting device for setting the threshold value. The threshold value setting device includes a display for displaying a peak value in a predetermined period which allows a user to read the peak value, wherein the peak value is determined by the computed shock value during the predetermined period and a threshold value input unit for inputting the threshold value manually.

Other aspects and advantages of the invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention together with objects and advantages thereof may best be understood by reference to the following description of the presently preferred embodiments together with the accompanying drawings in which:

DETAILED DESCRIPTION OF THE PREFERRED EMBODIMENTS

First and second embodiments according to the present invention will now be described with reference to FIGS. 1 through 15.

First Embodiment

Figure 1:
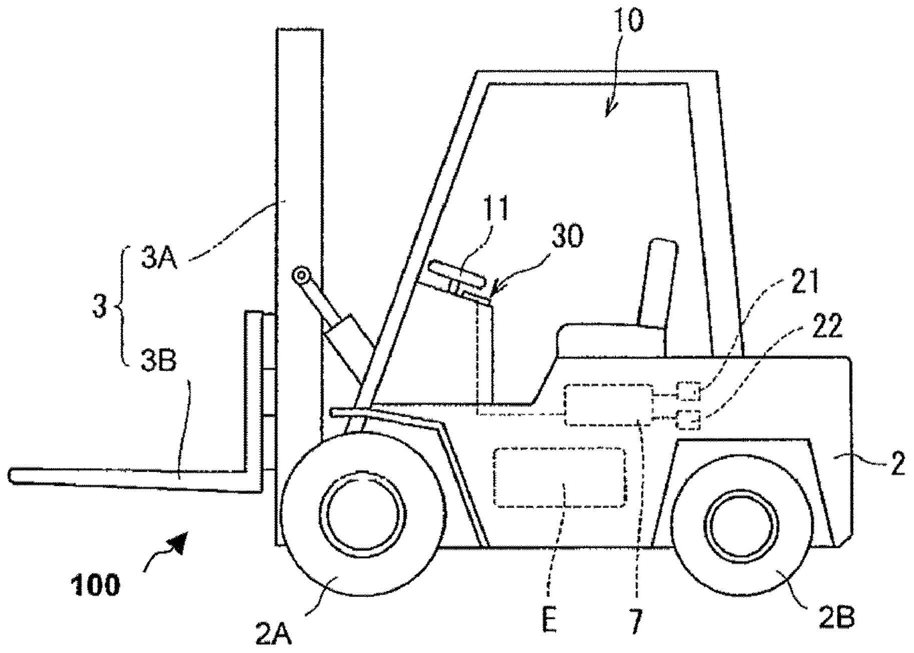
FIG. 1 is a schematic side view of a forklift truck with a shock-detecting apparatus according to a preferred first embodiment of the present invention.

A shock-detecting apparatus for an industrial vehicle (hereinafter, merely referred to as shock-detecting apparatus) 1 shown in FIG. 4 of first embodiment is embodied into a forklift truck 100 shown in FIG. 1 representing an industrial vehicle.

The forklift truck 100 has a vehicle body 2, driven and steered wheels 2A, 2B arranged in front and rear portions of the vehicle body 2, an engine E installed inside the vehicle body 2, an lifting device 3 standing in front of the vehicle body 2 and an operator's cab 10 provided above the vehicle body 2.

The lifting device 3 has a pair of masts 3A and a pair of forks 3B (only one fork being shown in the drawing) which are guided by the masts 3A and are driven by a lift cylinder and a chain (not shown) thereby to move up and down.

Figure 2:
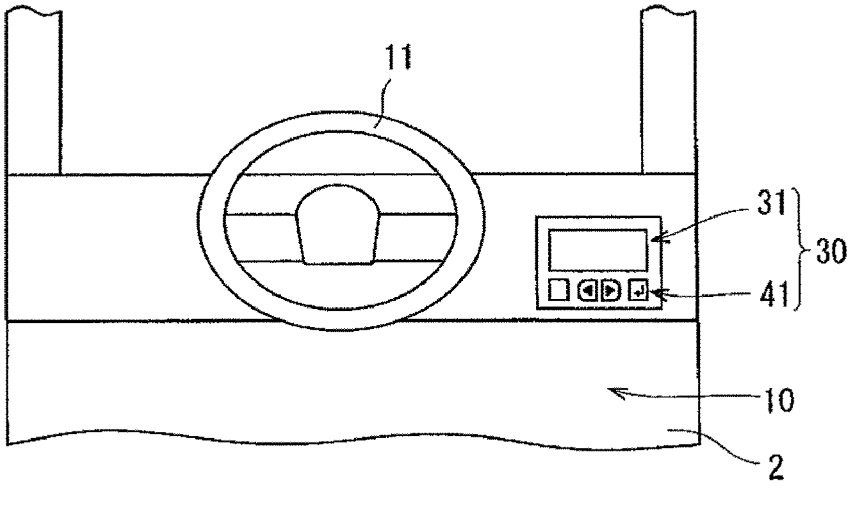
FIG. 2 is a schematic view of an operator's cab of the forklift truck with the shock-detecting apparatus of the first embodiment.

As shown in FIG. 2, in the front portion of the operator's cab 10, a steering wheel 11 for operating steered wheels 2B, a manual transmission shift lever for switching driving force transmitted to the driven wheels 2A (not shown), a lift lever for operating the lifting device 3 (not shown), a tilt lever (not shown) and the like are provided.

A multi display 30 is provided in the right of the steered wheel 11. As an enlarged view of the display shown in FIG. 3, the multi display 30 has a liquid crystal display 31 and an input panel 41.

The liquid crystal display 31 is configured by a dot-matrix in which each pixel is evenly provided in a grid array. This type of the liquid crystal display is disadvantageous in that each pixel is rather large and the refresh cycle of the display screen is slow, e.g., several tens to hundreds millisecond/cycle, however that type of the liquid crystal display is usually used for a display in the operator's cab of e.g. a forklift truck, due to low cost.

The input panel 41 has first, second, third and fourth buttons, 41A through 41D arranged at the lower side of the liquid crystal display 31. Due to the user's operation of the input panel 41, the information shown on the liquid crystal display 31 is changed, or desired values can be input to various control parameters. For example, when the user presses the fourth button 41D below the characters “NEXT” at the lower right of the screen of the liquid crystal display 31, the screen changes to the predetermined next page. The liquid crystal display 31 shows many pages in a predetermined order such as “Operating Speed Monitor” page (not shown), “Fuelmeter/Odometer Monitor” page (not shown), Lifting device Monitor” page (not shown), “Shock Value Monitor” page shown in FIG. 3, “Threshold Input (Front—Rear Direction)” page shown in FIG. 8, “Threshold Input (Right—Left Direction)” page (not shown) and the like.

As shown in FIG. 1, the vehicle body 2 has therein a controller 7 controlling the engine E, the lifting device 3 and so on. The controller 7 has an input interface 11, a CPU 10, a memory unit 13 and an output interface 12 as shown in FIG. 4.

The input interface 11 is connected to the input panel 41, shock sensors 21, 22 and other devices 23 such as various sensors provided in e.g., the engine E or the lifting device.

The output interface 12 is connected to the liquid crystal display 31 and other devices 33 such as various actuators provided in e.g., the engine E, the lifting device 3, a buzzer giving a warning tone at a step S120 in a shock-detecting display program (shown in FIG. 5), which is described below.

The memory unit 13 includes ROM, RAM, a memory and the like. The memory unit 13 stores therein a control program controlling operations of e.g., the engine E or the lifting device 3, data obtained through the input interface 11, and results computed in CPU 10 properly.

The CPU 10 is connected to the input interface 11, the memory unit 13 and the output interface 12. The CPU 10 executes a control program stored in the memory unit 13 and processes various data based on data obtained through the input interface 11. Accordingly, the CPU 10 sends control signals to various actuators provided in e.g., the engine E or the lifting device 3 through the output interface 12, or sends image data to the liquid crystal display 31.

While the forklift truck 100 with the above structure drives in the workshop with a lot of obstacles, it changes the traveling direction and speed frequently. The forklift truck 100 repeats loading operations such as lifting a heavy cargo, carrying it to a predetermined place and unloading it. If the operator accelerates or decelerates the forklift and change the traveling direction suddenly during the operation, the cargo may damage and collapse or the forklift truck 100 itself may break down. The forklift truck 100 of the first embodiment is provided with a shock-detecting apparatus 1 which detects an excessive shock and generates a warning signal thereby to enable the operator to take effective countermeasures for the proper maintenance of the cargo and the forklift truck 100. The following will describe the shock-detecting apparatus 1 in details.

The shock-detecting apparatus 1 has shock sensors 21, 22 and shares the controller 7 (input and output interfaces 11, 12, memory unit 13) and the multi display 30 (liquid crystal display 31 and input panel 41) with other system of the forklift truck 100. The memory unit 13 stores therein a shock-detecting display program (step 101-120) shown in FIG. 5.

The shock sensors 21, 22 employ a one-axis type accelerometer in the first embodiment. As shown in FIG. 1, the shock sensors 21, 22 are fixed in the vehicle body 2 so as to detect a shock in “front and rear” and “right and left” directions respectively. When the shock-detecting apparatus is activated, the shock sensors 21, 22 detect shocks as acceleration-change, acting on the vehicle body in the “front and rear” and the “right and left” directions respectively and generate voltage values as output signals fluctuating in accordance with the acceleration change. The CPU 10 receives the output signals from the shock sensors 21, 22 through the input interface 11 at a quite-short sampling period and accordingly, computes the shock values C based on the output signals in a step S105 (to be described).

Figure 6:
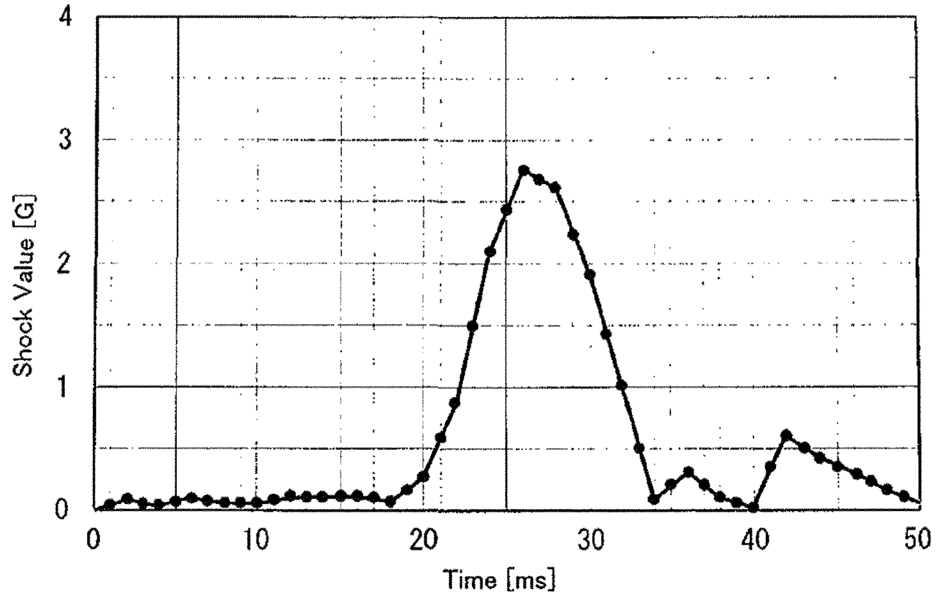
FIG. 6 is a graph showing output change of shock value computed by a shock value computer of the shock-detecting apparatus of the first embodiment.

In the first embodiment, the sampling time for the output signals of the shock sensors 21, 22 is set to 1 millisecond so as to detect the shock precisely. The graph in FIG. 6 shows output change of shock value C computed at each sampling time (1 millisecond). Each dot "•" indicates the shock value C computed at the step S105 in the shock-detecting display program. Since the shock converges very quickly, the shock values change in a pulse manner shown in FIG. 6 when the shock acts on the vehicle body 2.

Figure 5:
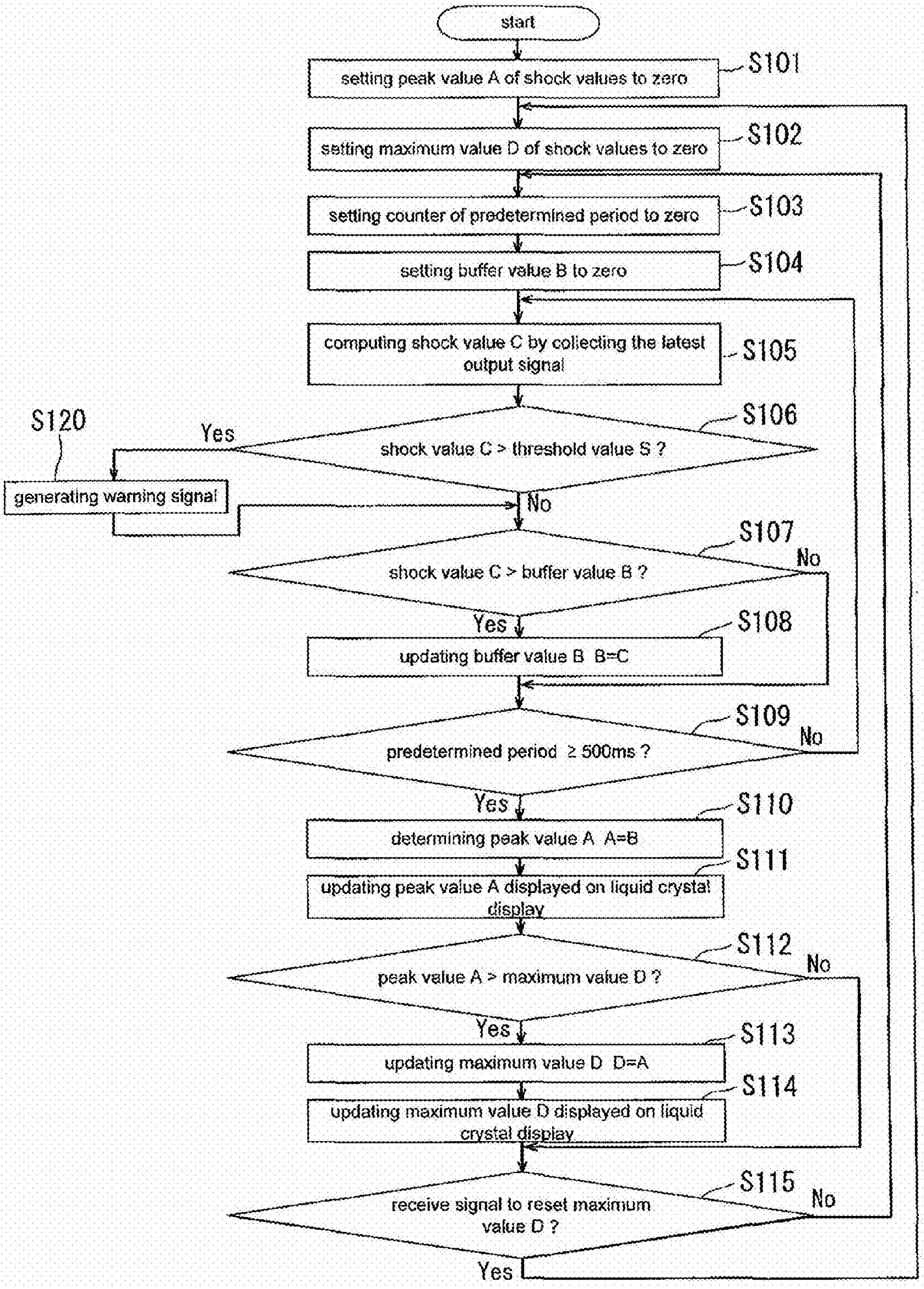
FIG. 5 is a flow chart showing control of a "Shock-Detecting Display Program" of the shock-detecting apparatus of the first embodiment.

The following will describe the procedure of the shock-detecting display program (steps, S101-S120) shown in FIG. 5. When the shock-detecting apparatus 1 is activated, the CPU 10 starts executing the shock-detecting display program. The shock-detecting display program steps (S101-S120) acting on the output signals of the shock sensors 21, 22 respectively are the same and executed simultaneously. Therefore, the following will describe the procedure of the shock-detecting display program (S101-S120) acting on the output signal of only the shock sensor 21, and the procedure for the shock sensor 22 is omitted. The shock-detecting display program (S101-S120) executes the following procedure in the background regardless of whether or not the page displayed on the liquid crystal display 31 of the multi display 30 is switched to the "Shock Value Monitor" page 31A shown in FIG. 3. When the user operates to switch the page displayed on the liquid crystal display 31, the liquid crystal display 31 of the multi display 30 switches the page to the "Shock Value Monitor" page 31A shown in FIG. 3 thereby to allow the user to confirm peak and maximum values A, D among shock values visually and to adjust a threshold value S.

At first, the peak value A is set to zero at a step S101. The peak value A means the peak value among the shock values C within a first predetermined period which allows the user to read the value. The first predetermined period is preferably set to between 10 millisecond and several seconds, and more preferably set to between several tens milliseconds and several hundreds milliseconds. In the first embodiment, the first predetermined period is set to 500 milliseconds that enables the user to read the value and also is not so long. 500 milliseconds are substantially the same as the update cycle of the page displayed on the liquid crystal display 31 (flashing cycle of each pixel composed of the dot matrix).

Then the step moves to S102 and the maximum value D is set to zero. The maximum value of the shock values C is stored as the maximum value D during an period longer than the first predetermined period, wherein the peak value A of the shock values C is updated. The maximum value D can be reset by the operation of the user at a step S115. The maximum value D may be reset when the shock-detecting apparatus is activated.

Then the step moves to S103 and the first predetermined period counter is set to zero. Accordingly, the first predetermined period counter starts to measure an period time in accordance with a real-time clock of the CPU 10.

Then the step moves to S104 and a buffer value B is set to zero. The buffer value B is a temporary value until the peak value A is determined.

Then the step moves to S105 and the latest output signal of the shock sensor 21 is received to compute the shock value C.

Then the step moves to S106 so as to judge whether or not the latest shock value C is greater than the threshold value S. The threshold value S is supposed to be determined by default or by inputting a desired value by the user through the "Threshold Input (Front—Rear)" page 31B shown in FIG. 8. The following is described on the assumption that the threshold value S is set to an arbitrary value.

If the shock value C is not greater than the threshold value S, the step judges "NO" at S106 and moves to S107.

On the other hand, if the shock value C is greater than the threshold value S, the step judges "YES" at S106 and move to S120. Then the step move to S107 after the warning signal is generated at S120. The CPU 10 executes an effective procedure for the maintenance of the cargo and the forklift truck 100 and a procedure 5101 through S120 according to the shock-detecting display program simultaneously. For example, it is possible to generate a control signal to a buzzer through the output interface 12 so as to give a warning tone and record "time and date" data in the memory unit 13. Furthermore, it is possible to limit the vehicle traveling and cargo loading speeds, and take a photo of the user.

At the step S106, whether or not the shock value C is greater than the threshold value S is judged at every sampling time, however different judging method may be employed. For example, if the duration time of the state in which the shock value C is greater than the threshold value S continues N times longer than the sampling time, it may be judged that the shock value C is greater than the threshold value S.

When the process moves from S106 to S107 or from S120 to S107, the process judges whether or not the latest shock value C is greater than a buffer value B.

If the latest shock value C is not greater than the buffer value B, the process judges "NO" at S107 and move to S109.

On the other hand, if the latest shock value C is greater than the buffer value B, the process judges "YES" at S107 and move to S108. Then the latest shock value C is assigned to the buffer value B as a temporary peak value and the process moves to S109.

When the process moves from S107 to S109 or from S108 to S109, the process judges whether or not the counter for measuring the first predetermined period is more than or equal to 500 milliseconds.

If the counter for measuring the first predetermined period is less than 500 milliseconds, the process judges "NO" at S109 and returns to S105.

On the other hand, if the counter for measuring the first predetermined period is more than or equal to 500 milliseconds, the step judges "YES" at S109 and moves to S110. Then the buffer value B is assigned to the peak value A at S110. Thus, the peak value A of the shock values C during the first predetermined period (500 milliseconds) is determined by the above steps, S103 through S105 and S107 through S110.

Then the process moves to S111 and the peak value A displayed on the liquid crystal display 31 is updated. For example, if the peak value A is 14.9 G, "Shock Value Front—Rear Direction: 14.9 G" is displayed on the "Shock Value Monitor" page 31A shown in FIG. 3.

Then the process moves to S112 and whether or not the peak value A is grater than the maximum value D is judged.

If the peak value A is not grater than the maximum value D, the process judges "NO" at S112 and moves to S115.

On the other hand, if the peak value A is grater than the maximum value D, the process judges "YES" at S112 and moves to S113. Then the peak value A is assigned to the maximum value D at S113. Thus, the maximum value D of the shock values C which are computed at S105 is determined at the steps 112, 113, from S102 in which the maximum value is set to zero to the present time.

Then the step moves to S114 and the maximum value D displayed on the liquid crystal display 31 is updated. For example, if the maximum value D is 15.0 G, "Shock Value (Front—Rear Direction) MAX 15.0 G" is displayed on the "Shock Value Monitor" page 31A shown in FIG. 3. Afterward, the step moves to S115.

When the step moves from S112 to S115 or from S114 to S115, whether or not the user orders to reset the maximum value D is judged. How the user orders to reset the maximum value D may be decided voluntarily. In the first embodiment, when the user presses the first button 41A below the characters "CLR" at the lower left of the "Shock Value Monitor" page 31A, an order to reset the maximum value D is given.

If the order is not given by the user to reset the maximum value D, the process judges "NO" at S115 and moves to S103 and repeats the above procedure.

On the other hand, if the order is given by the user to reset the maximum value D, the process judges "YES" at S115 and moves to S102 and repeats the above procedure after the maximum value D is set to zero.

Figure 7:
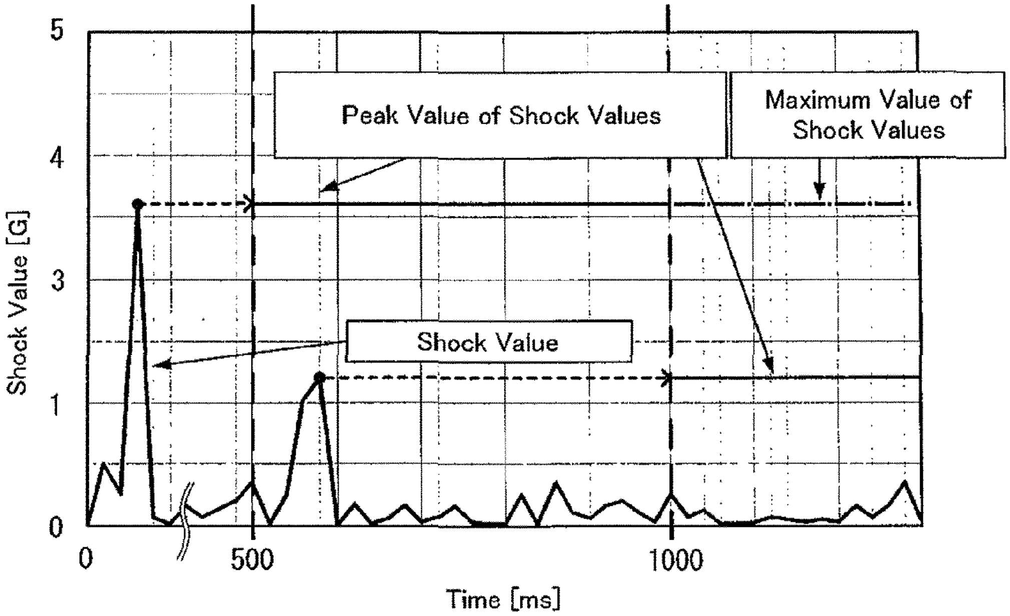
FIG. 7 is a graph showing output change of the shock value, peak value and maximum value computed by the shock value computer of the shock-detecting apparatus of the first embodiment.

FIG. 7 shows output change of the shock value C, the peak value A and the maximum value D. After the shock-detecting apparatus 1 is started, the shock value C shows a wave-form in a pulse manner in accordance with the occurrence of the shock. When 500 milliseconds elapse after the start-up, the peak value A of the shock values C is determined between 0 millisecond and 500 milliseconds. The peak value A of the shock values C between 0 millisecond and 500 milliseconds is also assigned to the maximum value D. The peak value A and the maximum value D are displayed on the "Shock Value Monitor" page 31A.

When 1000 milliseconds elapse after the start-up, the peak value A among the shock values C is determined between 500 millisecond and 1000 milliseconds. Accordingly, the peak value A displayed on the "Shock Value Monitor" page 31A is updated. In case of FIG. 7, since the peak value A among the shock values C between 500 millisecond and 1000 milliseconds is smaller than that between 0 millisecond and 500 milliseconds, the maximum value D is not renewed.

Thus, the shock-detecting apparatus 1 updates the peak value A and the maximum value D in correspondence to the output signal of the shock sensor 21 in this manner and displays both on the "Shock Value Monitor" page 31A according to the shock-detecting display program, S101 through S120. If the shock value C is greater than the threshold value S, the warning signal can be sent.

The shock-detecting apparatus 1 also executes the same procedure to the peak value and the maximum value in correspondence to the output signal of the shock sensor 22 and displays both on the "Shock Value Monitor" page 31A and generates the warning signal properly.

Figure 3:
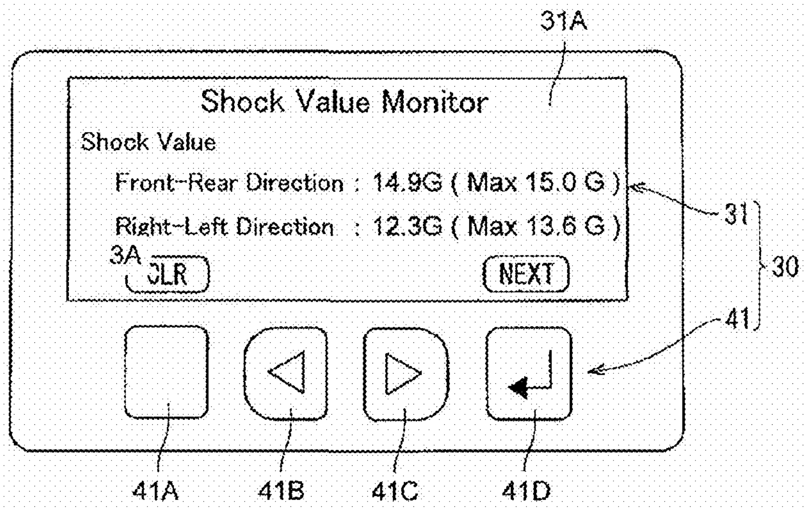
FIG. 3 is a schematic view of a multi display of the forklift truck with the shock-detecting apparatus of the first embodiment, showing a state in which "Shock Value Monitor" page is displayed on a liquid crystal display.

In the shock-detecting apparatus 1 of the first embodiment, when the user presses the fourth button 41D below the characters "NEXT" at the lower right of the liquid crystal display 31 shown in FIG. 3, the page is switched from the "Shock Value Monitor" page 31A to the "Threshold Input (Front—Rear Direction)" page 31B shown in FIG. 8 and the user can input the threshold value S for the no shock sensor 21. With regard to the threshold value S for the shock sensor 22, the user can switch the page to the "Threshold Input (Right—Left Direction)" page (not shown) and input the threshold value in the same manner. Since the procedure is the same as that taken in case of the "Threshold Input (Front—Rear Direction)" page 31B, the description is omitted.

Figure 8:
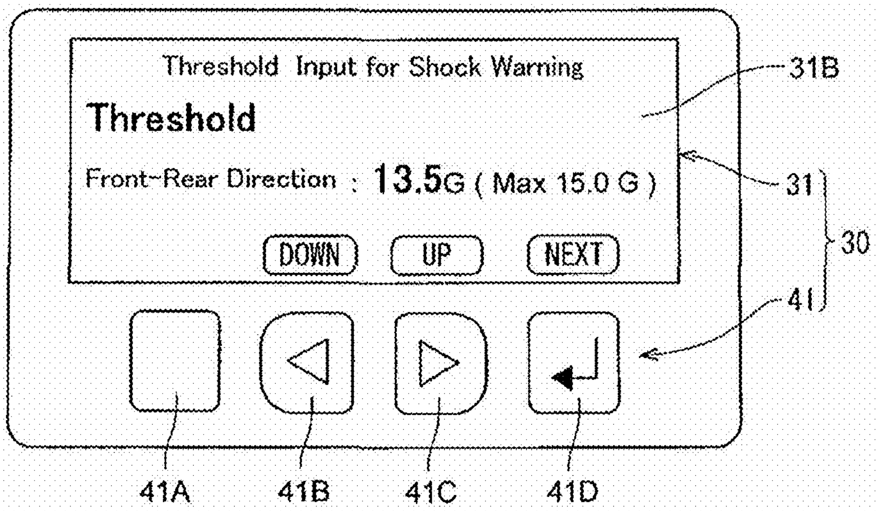
FIG. 8 is a schematic view of the multi display of the shock-detecting apparatus of the first embodiment, showing a state in which "Threshold Input (Front—Rear Direction)" page is displayed.
Figure 9:
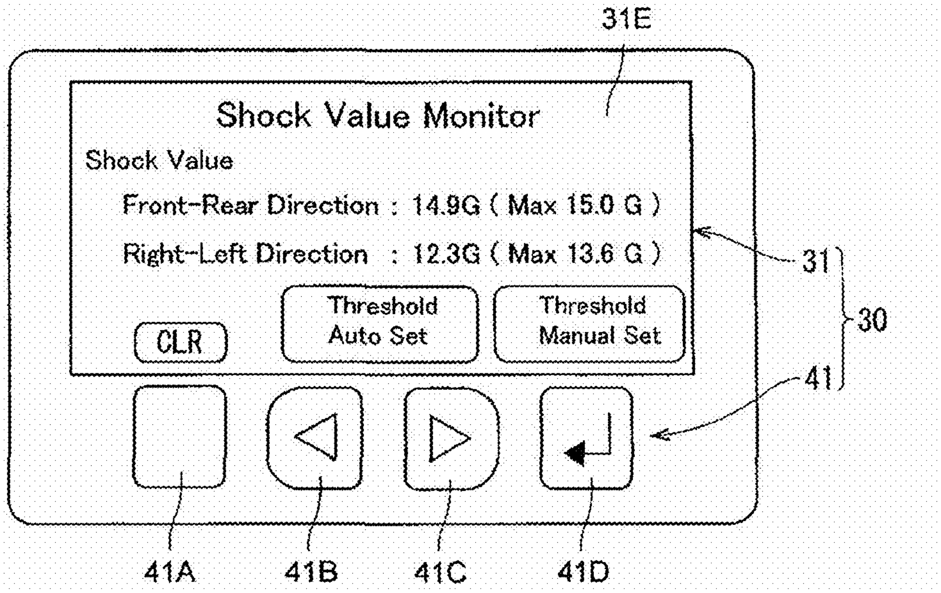
FIG. 9 is a schematic view of the multi display of the shock-detecting apparatus according to a second embodiment of the present invention, showing a state in which "Shock Value Monitor" page is displayed.

As shown in FIG. 8, the threshold value S set at present is displayed on the "Threshold Input (Front—Rear Direction)" page 31B. The maximum value D is also displayed to the right of the threshold value S. The user can decrease the threshold value S by pressing the second button 41B below the characters "DOWN" at the lower side of the "Threshold Input (Front—Rear Direction)" page 31B. Similarly, the user can increase the threshold value S by pressing the second button 41C below the characters "UP" at the lower side of the "Threshold Input (Front—Rear Direction)" page 31B. The changing operation of the threshold value S is completed, if the user switches the page to other page when the desired threshold value S for the user is displayed on the "Threshold Input (Front—Rear Direction)" page 31B.

The shock-detecting apparatus 1 of the first embodiment can detect the occurrence of the excessive shock and generate the warning signal thereby to enable the driver to take a proper procedure as described above. Accordingly, the situation can be avoided in which the cargo may damage and collapse, or the forklift truck 100 itself may break down.

In the shock-detecting apparatus 1 of the first embodiment, the shock sensors 21, 22 that are fixed to the forklift truck 100 correspond to a shock-detecting sensor as a shock-detecting means for detecting the shock and generating the output signal.

The step, S105 corresponds to a shock value computer as a shock value computing means for computing the shock value C based on the output signal which is received sequentially. The shock value computer may be realized by an electronic circuit.

The step, S106 corresponds to a judging device as a judging means for judging whether or not the shock value C is greater than the threshold value S. The judging means may be realized by an electronic circuit.

The step, S120 corresponds to a warning generator as a warning means for generating the warning signal when the step, S106 judges that the shock value C is greater than the threshold value S. The warning generator may be realized by an electronic circuit.

The controller 7 and the multi display 30 correspond to a threshold value setting device as a threshold value setting means for setting the threshold value S. The liquid crystal display 31 displaying the "Shock Value Monitor" page 31A corresponds to a display as a displaying means for displaying the peak value A of the shock values C in the first predetermined period which allows the user to read the peak value. The peak value A is determined by the computed shock value C during the first predetermined period. The liquid crystal display 31 also displays the maximum value D on the "Shock Value Monitor" page 31A, the "Threshold Input (Front—Rear Direction)" page 31B and the "Threshold Input (Right—Left Direction)" page (not shown). The liquid crystal display 31 further displays the threshold value S on the "Threshold Input (Front—Rear Direction)" page 31B and the "Threshold Input (Right—Left Direction)" page (not shown).

The input panel 41 corresponds to a threshold value input unit as a threshold value input means for inputting the threshold value S manually.

The steps, S103 through S105 and S107 through S110 correspond to a peak value computing device as a peak value computing means for computing the peak value A among the shock values C in the first predetermined period. The peak value computing device may be realized by an electronic circuit.

The steps, S112 and S113 correspond to a maximum value storing device as a maximum value storing means for storing the maximum value D of the shock values. The maximum value storing device may be realized by an electronic circuit.

The step, S115 corresponds to a resetting device as a resetting means for resetting the maximum value D of the shock values by the operation of the user. The resetting device may be realized by a button with an electronic circuit.

In the shock-detecting apparatus 1 of the first embodiment, the liquid crystal display 31 displays the updated peak value A on the "Shock Value Monitor" page 31A, based on the shock values computed sequentially in the step S105 during the first predetermined period. The first predetermined period (500 milliseconds in the first embodiment) is readably set for the user. Thus, when the user operating the forklift truck 100 with the shock-detecting apparatus 1 sets the threshold value S, the user can read the continually-changing peak value A of the shock values for sure while operating the forklift truck 100 in various kinds of sites and under various kind of environment. Therefore, the user can easily confirm a range of the shock values C acting on the forklift truck 100.

When the user recognizes a big shock while operating, the user can confirm the magnitude of the shock immediately by looking at the "Shock Value Monitor" page 31A. Conventionally, the user had to increase and decrease the threshold value repeatedly so as to pursue the proper threshold value (trial and error) if wrong warning signals are output in case of operating the forklift truck 100 after setting an arbitrary value as the threshold value S. However, the frequency of adjusting the threshold value S reduces because of the present invention, with the result that the user can set the reliable threshold value S easily so as to avoid the wrong warning signal.

Thus, the shock-detecting apparatus 1 of the first embodiment facilitates the setting operation of the threshold value thereby to improve the practical utility.

In the shock-detecting apparatus 1 of the first embodiment, the peak value A of the shock values during the first predetermined period is computed in the steps, S103 through S105 and S107 through S110 and the liquid crystal display 31 displays the updated peak value A on the "Shock Value Monitor" page 31A. Therefore, the user can see the continually-changing peak value A among the shock values more reliably.

The shock-detecting apparatus 1 of the first embodiment stores the maximum value D of the shock values in the steps, S112, S113 and displays the maximum value D on the "Shock Value Monitor" page 31A, the "Threshold Input (Front—Rear Direction)" page 31B and the "Threshold Input (Right—Left Direction)" page (not shown). Therefore, the user can easily recognize a range of the shock values C acting on the forklift truck 100, based on the peak value A and the maximum value D, thereby facilitating the setting operation of the threshold value.

The maximum value D can be reset by the user's order at the step, S115. Therefore, the shock-detecting apparatus 1 of the first embodiment can be easily applied to various kinds of sites and various kind of environment. For example, when the user performs the simulation test for the shocks acting on the forklift truck so as to set the threshold value S, the user can recognize the maximum value D more exactly during the test if he resets the maximum value D immediately before the test.

Furthermore, the shock-detecting apparatus 1 of the first embodiment displays the threshold value S on the "Threshold Input (Front—Rear Direction)" page 318 and the "Threshold Input (Right—Left Direction)" page (not shown). Therefore, the user can set the threshold value S easily because he can change the threshold value S, confirming visually the threshold value S set at present.

Since the forklift truck 100 with the shock-detecting apparatus 1 of the first embodiment facilitates the setting operation of the threshold value, the user can perform the loading operation more safe.

Second Embodiment

In the shock-detecting apparatus 1 of the first embodiment, the liquid crystal display 31 displays the "Shock Value Monitor" page 31A, the "Threshold Input (Front—Rear Direction)" page 31B and the "Threshold Input (Right—Left Direction)" page (not shown). On the other hand, in the shock-detecting apparatus of the second embodiment, the liquid crystal display 31 displays the "Shock Value Monitor" page 31E (shown in FIG. 9) and then the user can select the page between the page for inputting the threshold value manually and the page for setting the threshold value automatically. In case of the page for inputting the threshold value manually, the "Threshold Input (Front—Rear Direction)" page 31B and the "Threshold Input (Right—Left Direction)" page (not shown) are displayed, and in case of the page for setting the threshold value automatically, the "Threshold Auto Set Page (Front—Rear Direction)" 31F (shown in FIGS. 10-12) and the "Threshold Auto Set Page (Right—Left Direction)" 31G (shown in FIGS. 13-15) are displayed. Other structures of the second embodiment are the same as the first embodiment. The following will describe the "Shock Value Monitor" page 31E, the "Threshold Auto Set Page (Front—Rear Direction)" 31F and the "Threshold Auto Set Page (Right—Left Direction)" 31G, and the description of other structures will be omitted.

In the shock-detecting apparatus of the second embodiment, the shock-detecting display program (steps, S101-S120) is executed in the background as in the shock-detecting apparatus 1 of the first embodiment. If the user tries to switch the page, the page on the liquid crystal display 31 of the multi display 30 is switched to the "Shock Value Monitor" page 31E shown in FIG. 9.

On the "Shock Value Monitor" page 31E, the characters "Threshold Auto Set" and "Threshold Manual Input" are displayed at the lower right of the page of the liquid crystal display 31. The third button 41C is located below the characters "Threshold Auto Set" and the fourth button 41D is located below the characters "Threshold Manual Input". Since other displays are the same as the "Shock Value Monitor" page 31A (shown in FIG. 3) of the first embodiment, the description is omitted.

When the page is switched to the "Shock Value Monitor" page 31E, the user can confirm the peak and maximum values A, D visually and adjust the threshold value S.

In the second embodiment, in case of adjusting the threshold value S, the user can select the page between the "Threshold Auto Set" page and the "Threshold Manual Input" page.

When the user presses the fourth button 41D below the characters "Threshold Manual Input", the page of the liquid crystal display 31 is switched to the "Threshold Input (Front—Rear Direction)" page 31B and the "Threshold Input (Right—Left Direction)" page (not shown) in sequence. Thus, the user can set the threshold value S by inputting the desired value manually as before-mentioned.

Figure 10:
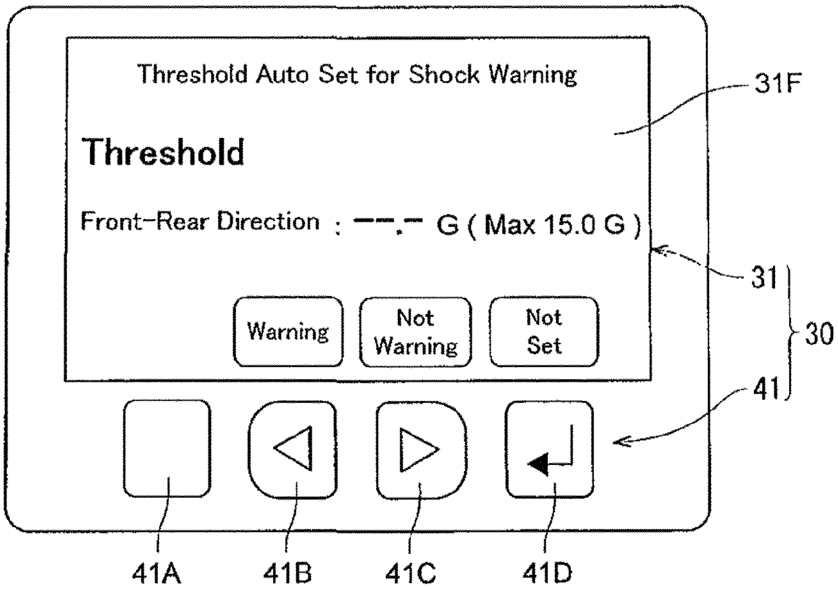
FIG. 10 is a schematic view of the multi display of the shock-detecting apparatus of the second embodiment, showing a state in which "Threshold Auto Set (Front—Rear Direction)" page is displayed and the threshold value is indeterminate.

On the other hand, when the user presses the third button 41C below the characters "Threshold Auto Set", the page of the liquid crystal display 31 is switched to the "Threshold Auto Set Page (Front—Rear Direction)" 31F (shown in FIG. 10).

The maximum value D in front and rear direction is displayed at the center right of the "Threshold Auto Set (Front—Rear Direction)" page 31F (e.g. "MAX 15.0 G"). At the left of the maximum value D, a, display portion for displaying the threshold value S in front and rear direction is provided if the threshold value S value is determined. Before the threshold value S in front and rear direction is determined, the characters "-.- G" is displayed at the display portion to show that the value is indeterminate.

At the lower extent of the "Threshold Auto Set (Front—Rear Direction)" page 31F, the characters "Warning", "Not Warning" and "Not Set" are displayed side by side. The switches 41B, 41C and 41D are located below the characters "Warning", "Not Warning" and "Not Set", respectively.

The characters “Warning” means that the warning signal is sent, if the maximum value D in front and rear direction displayed at the “Threshold Auto Set (Front—Rear Direction)” page 31F is detected as the subsequent shock value C in front and rear direction.

The characters “Not Warning” means that the warning signal is not sent, if the maximum value D in front and rear direction displayed at the “Threshold Auto Set (Front—Rear Direction)” page 31F is detected as the subsequent shock value C in front and rear direction.

When the user presses the fourth button 41D below the characters “Not Set”, the page of the “Threshold Auto Set (Front—Rear Direction)” page 31F finishes without setting the threshold value S in front and rear direction automatically. The page of the liquid crystal display 31 is switched to the “Threshold Auto Set (Right—Left Direction)” page 31G shown in FIG. 13. The details in the “Threshold Auto Set (Right—Left Direction)” page 31G will be described later.

Figure 11:
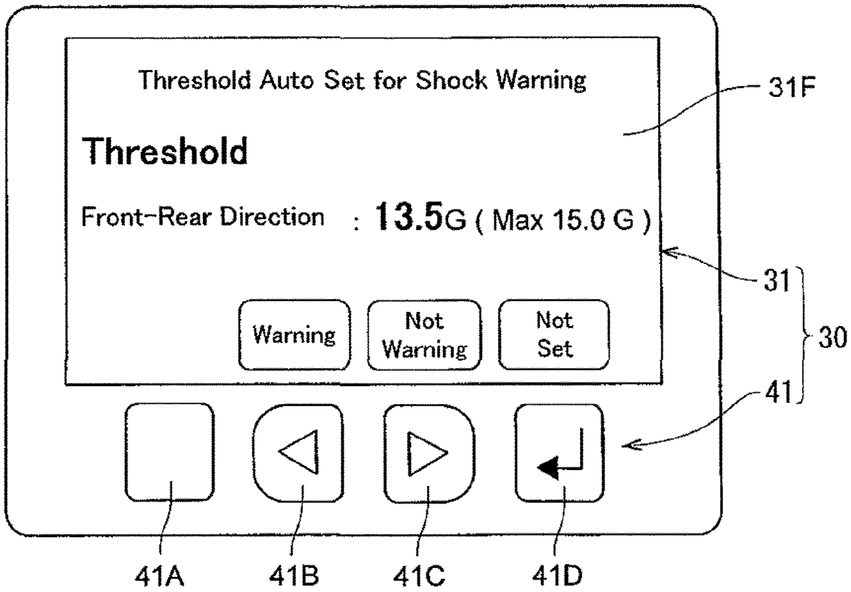
FIG. 11 is a schematic view of the multi display of the shock-detecting apparatus of the second embodiment, showing a state in which "Threshold Auto Set (Front—Rear Direction)" page is displayed and the threshold value is determined.

When the user presses the second button 41B below the characters “Warning”, the value computed by multiplying the maximum value D in front and rear direction displayed at the center right of the “Threshold Auto Set (Front—Rear Direction)” page 31F by a factor less than 1 (0.9 in the second embodiment) is set as the threshold value S in front and rear direction. Then, as shown in FIG. 11, the determined threshold value S in front and rear direction is displayed at the left of the maximum value D in front and rear direction on the “Threshold Auto Set (Front—Rear Direction)” page 31F. In case of FIGS. 10 and 11, the threshold value “13.5” in front and rear direction is determined by multiplying the maximum value “15.0” in front and rear direction by “0.9”.

Figure 12:
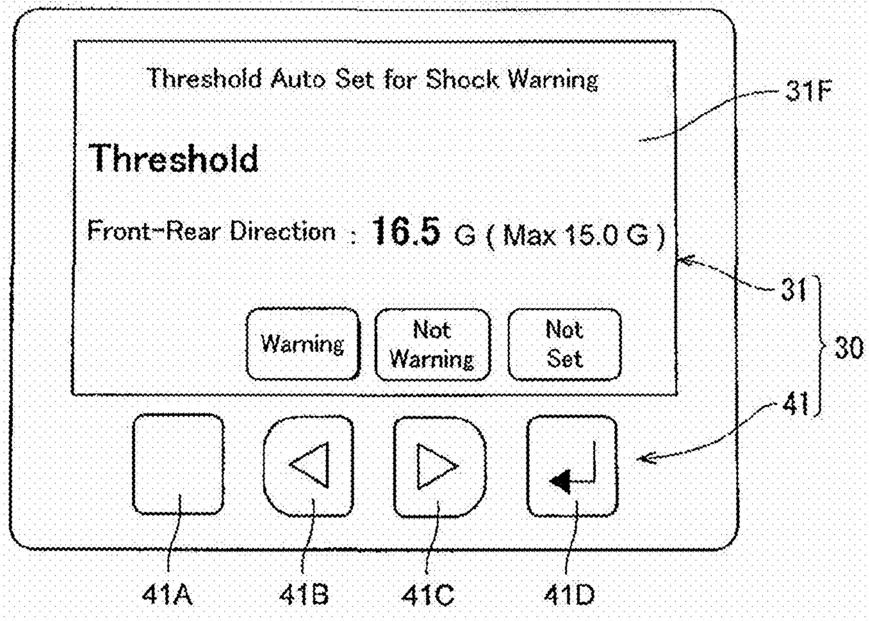
FIG. 12 is another schematic view of the multi display of the shock-detecting apparatus of the second embodiment, showing a state in which "Threshold Auto Set (Front—Rear Direction)" page is displayed and the threshold value is determined.
Figure 13:
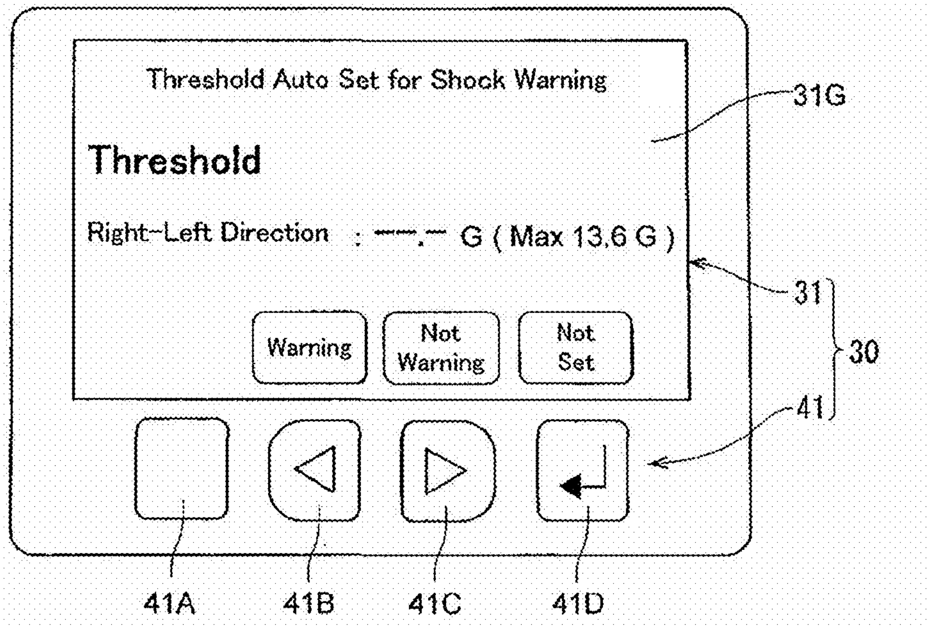
FIG. 13 is a schematic view of the multi display of the shock-detecting apparatus of the second embodiment, showing a state in which “Threshold Auto Set (Right—Left Direction)” page is displayed and the threshold value is indeterminate.

When the user presses the third button 41C below the characters “Not Warning”, the value computed by multiplying the maximum value D in front and rear direction displayed at the center right of the “Threshold Auto Set (Front—Rear Direction)” page 31F by a factor more than 1 (1.1 in the second embodiment) is set as the threshold value S in front and rear direction. Then, as shown in FIG. 12, the determined threshold value S in front and rear direction is displayed at the left of the maximum value D in front and rear direction on the “Threshold Auto Set (Front—Rear Direction)” page 31F. In case of FIGS. 10 and 12, the threshold value “16.5” in front and rear direction is determined by multiplying the maximum value “15.0” in front and rear direction by “1.1”

Thus, when the threshold value S in front and rear direction is determined on the “Threshold Auto Set (Front—Rear Direction)” page 31F or when the user presses the fourth button 41D below the characters “Not Set”, the page of the “Threshold Auto Set (Front—Rear Direction)” page 31F finishes. Then the page of the liquid crystal display 31 is switched to the “Threshold Auto Set (Right—Left Direction)” page 31G shown in FIG. 13.

The maximum value D in right and left direction is displayed at the center right of the “Threshold Auto Set (Right—Left Direction)” page 31G (e.g., “Max 13.6 G”). At the left of the maximum value D in right and left direction, a display portion for displaying the threshold value S in right and left direction is provided if the value is determined. Before the threshold value S in right and left direction is determined, “-.-G” is displayed at the display portion to show that the value is indeterminate.

At the lower extent of the “Threshold Auto Set (Right—Left Direction)” page 31G, the characters “Warning”, “Not Warning” and “Not Set” are displayed side by side. The switches 41B 41C and 41D are located below the characters “Warning”, “Not Warning” and “Not Set”, respectively.

The characters “Warning” means that the warning signal is sent, if the maximum value D in right and left direction displayed at the “Threshold Auto Set (Front—Rear Direction)” page 31G is detected as the subsequent shock value C in right and left direction.

The characters “Not Warning” means that the warning signal is not sent, if the maximum value D in right and left direction displayed at the “Threshold Auto Set (Front—Rear Direction)” page 31G is detected as the subsequent shock value C in right and left direction.

When the user presses the fourth button 41D below the characters “Not Set”, the page of the “Threshold Auto Set (Right—Left Direction)” page 31G finishes without setting the threshold value S in right and left direction automatically. The page of the liquid crystal display 31 is switched to the next page.

Figure 14:
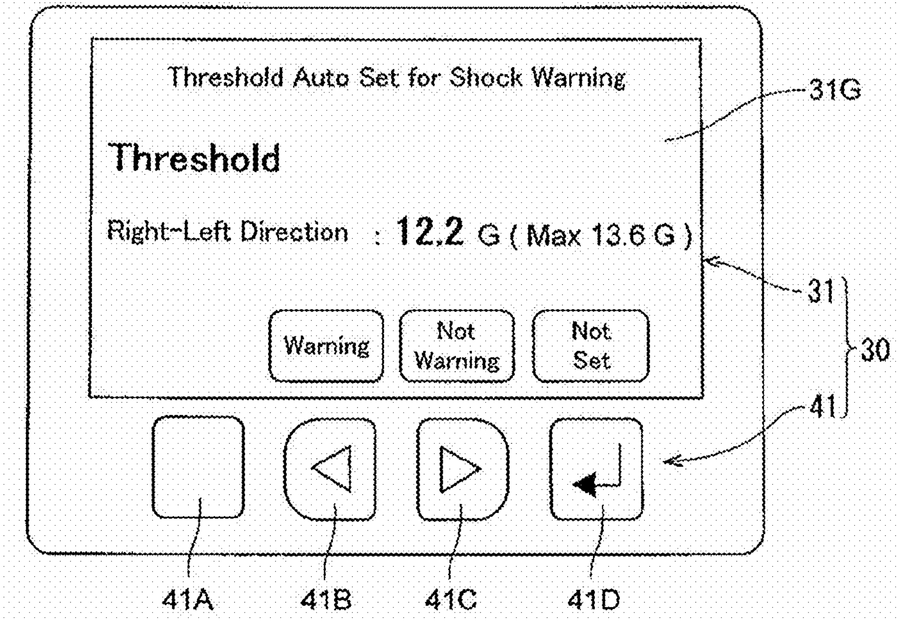
FIG. 14 is a schematic view of the multi display of the shock-detecting apparatus of the second embodiment, showing a state in which “Threshold Auto Set (Right—Left Direction)” page is displayed and the threshold value is determined.

When the user presses the second button 41B below the characters “Warning”, the value computed by multiplying the maximum value D in right and left direction displayed at the center right of the “Threshold Auto Set (Right—Left Direction)” page 31F by a factor less than 1 (0.9 in the second embodiment) is set as the threshold value S in right and left direction. Then, as shown in FIG. 14, the determined threshold value S in right and left direction is displayed at the left of the maximum value D in right and left direction on the “Threshold Auto Set (Right—Left Direction)” page 31G. In case of FIGS. 13 and 14, the threshold value “12.2” in right and left direction is determined by multiplying the maximum value “13.6” in right and left direction by “0.9”.

Figure 15:
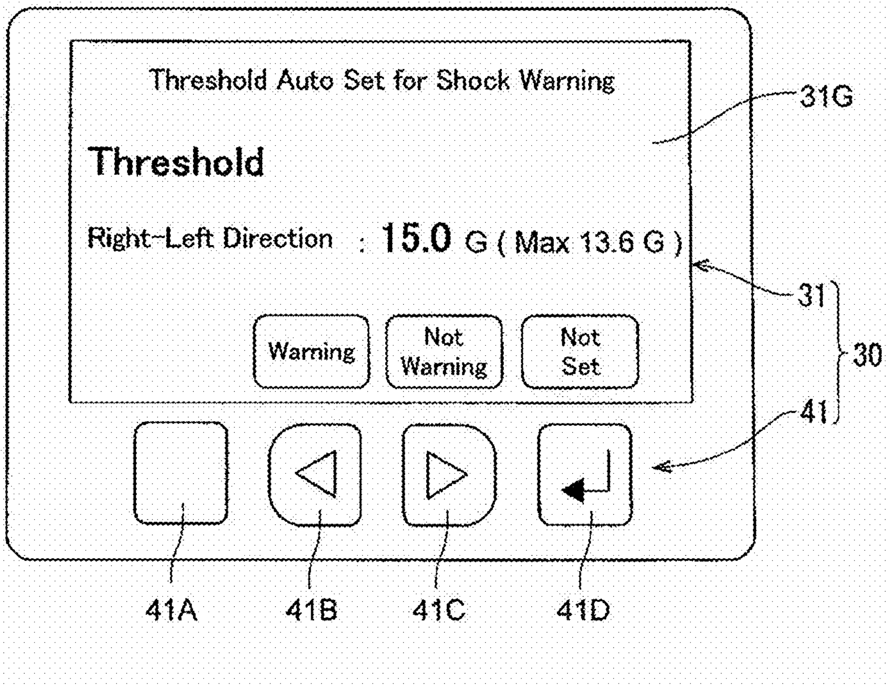
FIG. 15 is another schematic view of the multi display of the shock-detecting apparatus of the second embodiment, showing a state in which “Threshold Auto Set (Right—Left Direction)” page is displayed and the threshold value is determined.

When the user presses the third button 41C below the characters “Not Warning”, the value computed by multiplying the maximum value D in right and left direction displayed at the center right of the “Threshold Auto Set (Right—Left Direction)” page 31G by a factor more than 1 (1.1 in the second embodiment) is set as the threshold value S in front and rear direction. Then, as shown in FIG. 15, the determined threshold value S in right and left direction is displayed at the left of the maximum value D in right and left direction on the “Threshold Auto Set (Right—Left Direction” page 31G. In case of FIGS. 13 and 15, the threshold value “15.0” in right and left direction is determined by multiplying the maximum value “13.6” in right and left direction by “1.1”.

Thus, when the threshold value S in right and left direction is determined on the “Threshold Auto Set (Right—Left Direction)” page 31G or when the user presses the fourth button 41D below the characters “Not Set”, the page of the “Threshold Auto Set (Right—Left Direction)” page 31G finishes. Then the page of the liquid crystal display 31 is switched to the next page.

When the user presses the fourth button 41D below the characters “Not Set” on the “Threshold Auto Set (Front—Rear Direction)” page 31F or the “Threshold Auto Set (Right—Left Direction)” page 31G, the threshold value S in “front and rear” or “right and left” direction is indeterminate. Separately, the user switches the page to the “Threshold Input (Front—Rear Direction)” page 31B or the “Threshold Input (Right—Left Direction)” page (not shown) and inputs manually the threshold value S in “front and rear” or “right and left” direction.

In this case, the characters “Threshold Auto Set” displayed at the lower side of the “Shock Value Monitor” page 31E and the third button 41C correspond to a selecting device as a selecting means. The characters “Warning” and “Not Warning” which are displayed at the lower extent of the “Threshold Auto Set (Front—Rear Direction)” page 31F and the “Threshold Auto Set (Right—Left Direction)” page 31G and the second and third buttons 41B, 41C correspond to an assigning device as an assigning means. Both the selecting device and the assigning device may be realized by a button with an electronic circuit.

The same advantageous effects as in the shock-detecting apparatus 1 of the first embodiment are obtained in the shock-detecting apparatus of the second embodiment.

Since the user can have a choice in which the threshold value S is set based on the maximum value D by a combination of the characters "Threshold Auto Set" and the third button 41C as the threshold value inputting means, the user dispenses with a time-consuming operation as compared with the case in which the user sets the threshold value S by operating the input panel 41 directly. Therefore, the shock-detecting apparatus of the second embodiment facilitates the user to set the threshold value S.

Furthermore, in the shock-detecting apparatus of the second embodiment, if the maximum value D displayed at the "Threshold Auto Set (Front—Rear Direction)" page 31F or the "Threshold Auto Set (Right—Left Direction)" page 31G is detected as the subsequent shock value C afterward, the user can decide whether or not the warning signal is sent, by a combination of the characters "Warning", "Not Warning" and the second and third buttons 41B, 41C as the assigning device. In this way, the shock-detecting apparatus of the second embodiment can reflect the user's needs.

The present invention is not limited to the first and second embodiments but may be modified within the scope of the appended claims.

Figure 4:
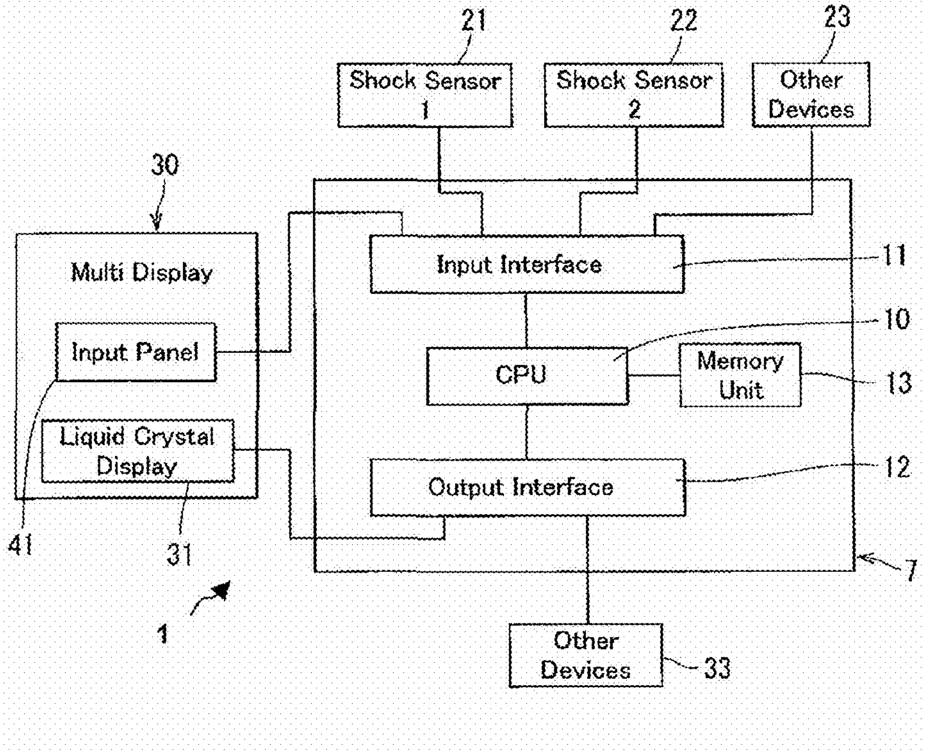
FIG. 4 is a block diagram showing a structure of the shock-detecting apparatus for an industrial vehicle of the first embodiment.

Though the system structure in the first and second embodiments is simplified so as to describe short-hand, the present invention is not to be limited to the system structure in the block diagram shown in FIG. 4. More specifically, in the first and second embodiments, the CPU 10 controls the liquid crystal display 31 and the input panel 41 through the input and output interfaces 11, 12. However, the multi display 30 may have an independent CPU controlling the liquid crystal display 31 and the input panel 41. In this case, the displayed information on the liquid crystal display 31, the warning signal order and other information are transmitted each other through communication between the CPU 10 and the independent CPU of the multi display 30. Accordingly, the same advantageous effects as mentioned before in the present are obtained.

The present invention is applied to an industrial vehicle.

What is claimed is:

1. A shock-detecting apparatus for an industrial vehicle comprising:

a shock-detecting sensor for detecting a shock and generating an output signal, the shock-detecting sensor being fixed to the industrial vehicle;

a shock value computer for computing a shock value based on the output signal which is received sequentially;

a judging device for judging whether or not the shock value is greater than a threshold value;

a warning generator for generating a warning signal when the judging device judges that the shock value is greater than the threshold value; and a threshold value setting device for setting the threshold value, wherein the threshold value setting device includes:

a display for displaying a peak value in a predetermined period which allows a user to read the peak value, wherein the peak value is determined by the computed shock value during the predetermined period; and a threshold value input unit for inputting the threshold value manually.

2. The shock-detecting apparatus for an industrial vehicle according to claim 1, the threshold value setting device further including;

a peak value computing device for computing the peak value in the predetermined period.

3. The shock-detecting apparatus for an industrial vehicle according to claim 1, the threshold value setting device further including:

a maximum value storing device for storing a maximum value of the computed shock values, wherein the display displays the maximum value.

4. The shock-detecting apparatus for an industrial vehicle according to claim 3, the threshold value input unit further including:

a selecting device for selecting by the user to set the threshold value based on the maximum value or not.

5. The shock-detecting apparatus for an industrial vehicle according to claim 4, the threshold value input unit further including:

an assigning device for setting the threshold value by multiplying the maximum value by a factor, wherein the factor is selected by the user in plural predetermined ones if setting the threshold value is selected by the selecting device.

6. The shock-detecting apparatus for an industrial vehicle according to claim 3, the threshold value input unit further including:

a resetting device for resetting the maximum value.

7. The shock-detecting apparatus for an industrial vehicle according to claim 1, wherein the display displays the threshold value.

8. The shock-detecting apparatus for an industrial vehicle according to claim 1, wherein the shock-detecting apparatus is mounted on the industrial vehicle.

9. A shock-detecting apparatus for an industrial vehicle comprising:

a shock-detecting means for detecting a shock and generating an output signal, the shock-detecting means being fixed to the industrial vehicle;

a shock value computing means for computing a shock value based on the output signal which are received sequentially;

a judging means for judging whether or not the shock value is greater than a threshold value;

a warning means for generating a warning signal when the judging means judges that the shock value is greater than the threshold value; and a threshold value setting means for setting the threshold value, wherein the threshold value setting means includes:

a displaying means for displaying a peak value in a predetermined period which allows a user to read the peak value, wherein the peak value is determined by the computed shock value during the predetermined period; and a threshold value input means for inputting the threshold value manually.

* * * * *